May 4, 1943.  O. W. SAILER  2,318,529
WINDSHIELD CLEANING APPARATUS
Filed Jan. 20, 1940  2 Sheets-Sheet 1
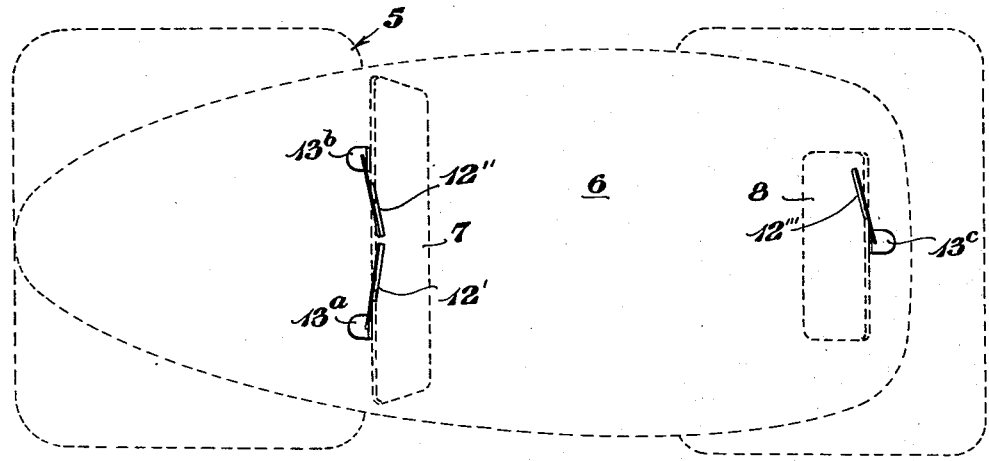
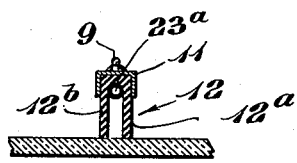
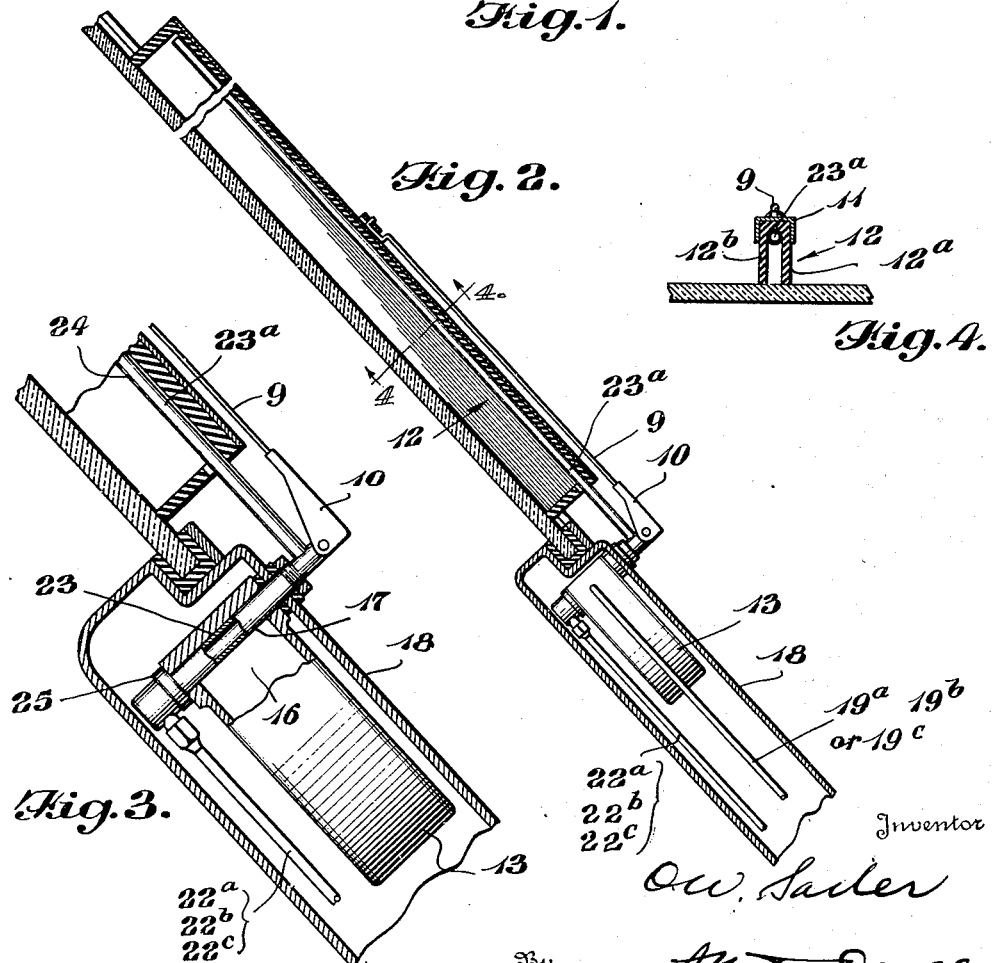

Patented May 4, 1943

2,318,529

UNITED STATES PATENT OFFICE 2,318,529

WINDSHIELD CLEANING APPARATUS

Orville W. Sailer, Washington, D. C.

Application January 20, 1940, Serial No. 314,878

4 Claims. (Cl. 15—250.5)

This invention relates to window and windshield cleaning apparatus for motor vehicles and, generally stated, contemplates the provision of improved means for use with a motor vehicle whereby both the windshield and rear window of the vehicle body may be maintained clean and clear under all weather conditions.

The apparatus is of that type utilizing a heating fluid as a defrosting medium in connection with a windshield cleaner or wiper; and an object of the invention is to generally improve windshield and window cleaning devices of this type and render the same more efficient in operation.

Another and more specific object is to provide a windshield and window cleaner for motor vehicles in which a heating and defrosting and washing fluid, such as hot air or hot water, may be selectively directed to one or more windshield wipers and through the latter applied to the windshield or window of the vehicle body in a manner such as to most efficiently perform its cleaning and washing functions.

A further object is to generally improve windshield and window cleaning apparatus for motor vehicles.

The foregoing and other objects and advantages will become apparent in view of the following description taken in conjunction with the drawings, wherein:

Fig. 1 is a plan view of an automobile equipped with windshield and window cleaning apparatus constructed in accordance with the features of the present invention;

Fig. 2 is a sectional view taken through the windshield or rear window of the motor vehicle body of Fig. 1, illustrating the preferred construction and manner of mounting one of the wiper assemblies;

Fig. 3 is a portion of Fig. 2 enlarged;

Fig. 4 is a sectional view taken on the line 4—4 Fig. 2; and

Figure 5:
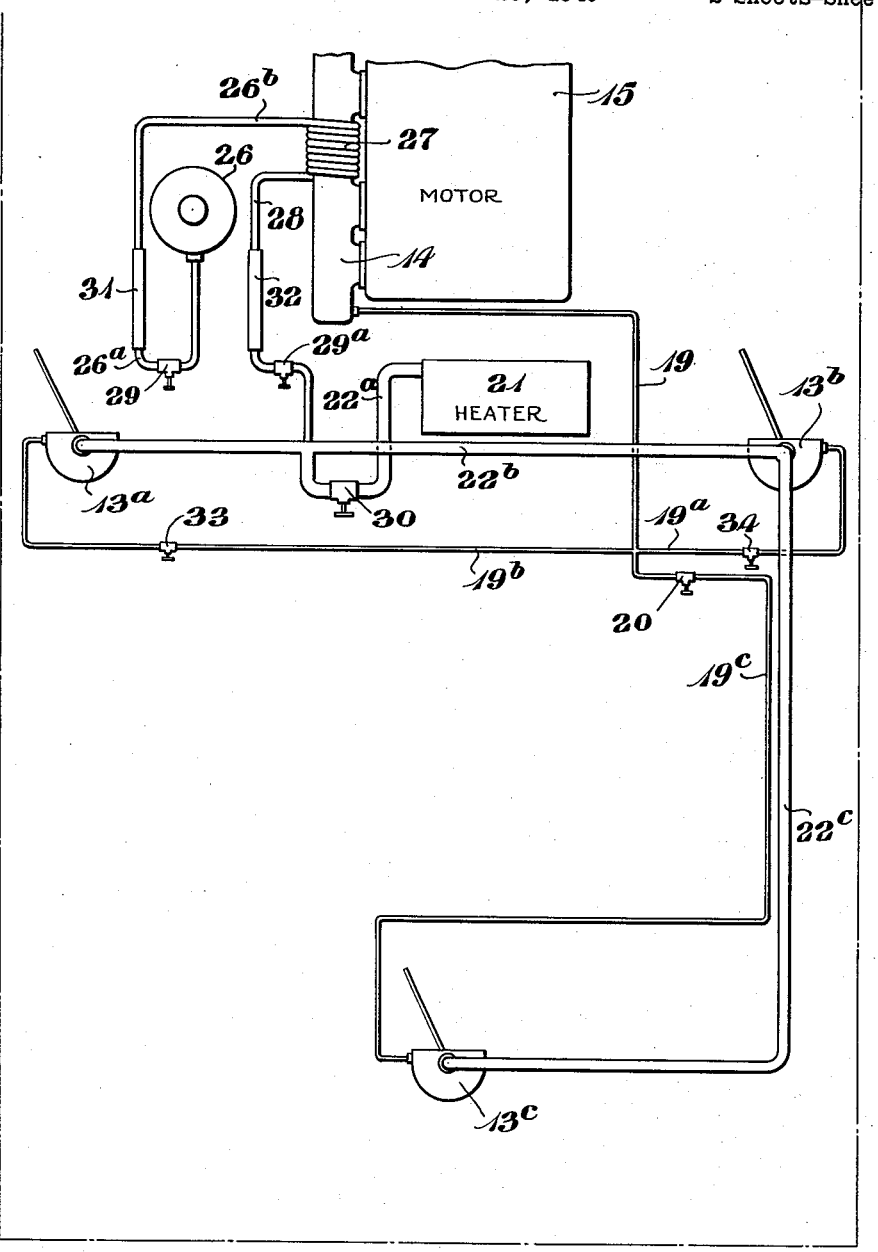
Fig. 5 is a schematic view of the apparatus and interconnecting conduits or circuits.

Generally stated, the apparatus comprises a plurality of wiper assemblies arranged to clean not only the windshield but also the rear window, and in connection therewith, means is provided for selectively directing a defrosting or heating and washing medium, either hot air or hot water or other liquid to and through the wiper assemblies, and thence against the windshield or window, the wiper or cleaner blade being constructed in a manner such as to prevent contact of outside air with the defrosting and/or washing medium until it reaches the surface of the glass to be cleaned.

Referring to the drawings in detail, a motor vehicle is generally indicated at 5 and is provided with a body 6 having a front windshield 7 and a rear window 8.

The windshield wiper assemblies or units, both front and back, are preferably of the construction best illustrated in Figs. 2, 3 and 4. Each wiper assembly comprises a blade arm 9 which at its one end is connected to a swivel bracket 10 and at its opposite end is connected to a holder 11 in which is secured the wiper blade, generally indicated at 12 in Figs. 2, 3 and 4 and at 12', 12" and 12''' in Fig. 1. By referring to Fig. 4 it will be noted that the wiper blade is channeled or has a pair of substantially parallel blades 12a and 12b, for a purpose to be described.

The wiper arm is operated by a motor 13 which, as shown in the present instance, is of the vacuum type and connects with the manifold 14 of the engine or motor 15 note Fig. 5. The motor 13 is provided with a vane 16 which is connected to a drive shaft 17 and oscillates the latter, the motor and shaft assembly being mounted in a housing 18. A vacuum line 19 is tapped at its intake end into the exhaust manifold 14 and is provided with branches 19a and 19b which lead to a pair of windshield wiper motors 13a and 13b.

The vacuum line 19 is provided with a further branch line 19c which leads to an additional windshield wiper motor 13c for the rear window 8 and which motor serves to actuate the wiper 12''', note Fig. 1. The line 19c is provided with a manually operable valve 20 and whereby the rear window cleaner may be put into operation at the will of the driver of the vehicle.

Means are provided for conducting either hot air or hot water at the will of the operator to the wipers 12', 12" and 12''' and in a manner such as to ensure an effective cleaning action without the water freezing or congealing on the glass before it has a chance to carry out its washing or cleaning function or the hot air cooling before it has a chance to carry out its defrosting function.

The means for conducting hot air to the windshield wipers is best shown in Fig. 5 and includes a heater 21 which may be the conventional car body heater, or may be a special heater adapted for the purpose, a line 22a leading from the heater chamber and connecting with the respective wipers 12', 12" and 12''' through branch lines 22a, 22b and 22c. By referring to Fig. 3 it will be noted that each of the shafts 17 on which the wiper vane 16 is mounted is hollow or formed with a conduit 23, the air or hot water passing through either one of the lines 22a, 22b or 22c flowing through the conduit 23 and into a tube or conduit 23a which is disposed between the blades 12a and 12b of each of the windshield wipers and has a plurality of spray outlets 24. Since the shaft 17 rotates with the blade or vane 16 of the windshield wiper motor, the tube 23a also rotates with the wiper, there being a sealed joint or bearing 25 provided at the juncture of the shaft 17 with the tube 22a, 22b or 22c.

It will be noted that as the fluid medium, either hot air or hot water, is ejected through the spray openings 24 of the tube 23a it is protected or shielded on both sides by the blades 12a and 12b of the wiper. Thus the thermal loss at the point where the temperature is the lowest, and which would otherwise be exposed, is reduced to a minimum. This is important in the case of the use of warm or hot water, since it prevents the latter from freezing or congealing and in the case of hot air, prevents cooling, so that these respective mediums retain their heat until in actual contact with the glass.

The preferred manner of introducing hot or warm water or other fluid to the respective wipers 12', 12" and 12'" comprises a tank or reservoir 26 which is mounted under the hood and adjacent the motor to avoid freezing of its contents, and communicates through a line 26a, 26b with a heater coil 27 wrapped around the exhaust manifold 15 of the motor 15 and by means of which any water or other fluid in said coil may be quickly heated. A line 28 leads from the heater coil 27 to the branch line 22b forming part of the hot air circuit from the heater 21. A combined check valve and manual control valve 29 is interposed between the lines 26 and 26a to prevent back flow of fluid into the tank 26 and to release fluid from the tank at the will of a driver or operator; and a manually operated valve 29a is provided at the juncture of the line 28 with the line 22 for admitting water under thermal pressure into the lines 22a and 22b. Also, the line 22 from the heater 21 is provided with a valve 30, which may also be manually operated to cut off the hot air from the lines 22a and 22b when it is desired to use warm water or other fluid from the tank or reservoir 26. A combined thermal break and flexible coupling 31 is preferably interposed between the lines 26a and 26b and an additional flexible combined coupling and thermal break 32 is interposed in the line 28. The valves indicated at 33, and 34 are for selective control of the wipers 12' and 12".

In operation, assuming it is desired to use the windshield wipers 13a and 13b and/or 13c, then the valves 29, 29a and 30 may be maintained closed and the valves 20, 33 and 34 opened, permitting the vacuum pressure from the exhaust manifold 15 to act on the vanes 16 of the respective windshield wiper motors 13a, 13b and 13c in the usual or conventional manner. In the event it is desired to use hot air only in conjunction with the windshield wipers 12', 12" and 12'", then the valve 30 may be opened and the valves 29 and 29a maintained closed, the hot air then passing from the chamber of the heater 21 through the lines 22, 22a, 22b and 22c into the tube 23a of each wiper and out through the nozzle openings 24.

Assuming it is desired to use hot or warm water or other fluid from the tank 26, then the valves 29 and 29a may be opened and the valve 30 closed, whereupon the fluid from the tank or reservoir 26 passes by gravity into the coil 27, where it is immediately heated and then forced by thermal pressure through the line 28 into the branch line 22, 22b and 22c and through the latter and the hollow shaft 23 into the tube 23a and out through the spray nozzles 24. In this manner, no separate motor or other moving parts are required to force the hot water or other fluid outwardly between the windshield wiper blades 12a and 12b, the water being heated and then forced by thermal action to the point of application.

It will be understood that the arrangement of the various conduits as shown in the drawings is for illustrative purposes only and that the same may be varied to a certain extent for the purposes of simplification and adaptation without departing from the spirit or scope of the invention as defined by the appended claims.

What is claimed is:

1. A window clearing system for a motor vehicle having a windshield, a back window, an internal combustion power plant affording a source of pressure influence, an exhaust conduit and a hot air car heater, said system comprising in combination; a wiper mechanism for said windshield and a wiper mechanism for said window, each including a wiper arm operatively connected to said pressure source, a wiper blade connected to each arm, a reservoir for a defrosting fluid, a fluid conduit positioned in heat exchange relation with said plant connecting said reservoir with said blade, said conduit including a coil in heat exchange relation to said exhaust conduit and adapted to receive fluid by gravity from said reservoir, means for releasing fluid from said reservoir to permit it to flow by gravity to said coil wherein the heat from said exhaust conduit may expand said fluid and thereby force it to travel through said fluid conduit to said blade, and means interposed between said reservoir and said coil to automatically prevent back pressure in said reservoir, means for releasing defrosting fluid to said blade from said reservoir, and means for releasing hot air to said blade from said car heater whereby hot air and hot fluid may be alternately or concurrently delivered to said blade.

2. A window clearing system for a motor vehicle having a power plant including a source of pressure and an exhaust conduit, said system comprising in combination; a plurality of window clearing mechanisms each including a wiper arm operatively connected to said pressure source, a wiper blade connected to said arm, a reservoir for a defrosting fluid, a fluid conduit connecting said reservoir with said blade, said conduit including a coil in heat exchange relation with said exhaust conduit and adapted to receive fluid by gravity from said reservoir, means for releasing fluid from said reservoir to permit it to flow by gravity to said coil wherein the heat from said exhaust conduit may expand said fluid and thereby force it to travel through said fluid conduit to said blade, means interposed between said reservoir and said coil to prevent back pressure in said reservoir, and means for releasing said fluid to said blade.

3. A window cleaning system for a motor vehicle having a windshield and a back window, said system comprising a wiping mechanism in operative relation with said windshield, a wiping mechanism in operative relation with said rear window, a source of pressure influence, a source of heated air and a source of heated fluid located in said vehicle, primary conduit means connecting said pressure source with said wiper mechanisms, secondary conduit means connecting said liquid source and said air source with said wipers, and means for selectively establishing communication between said wiper mechanisms and said sources.

4. A clearing system for a motor vehicle having a windshield, a back window, an internal combustion power plant affording a source of pressure influence, an exhaust conduit, and a hot air car heater, said system comprising in combination; a primary pressure conduit and a primary fluid conduit extending to the windshield and the window, both conduits being connected to a wiper mechanism for the windshield and a wiper mechanism for the window, each wiper mechanism including a wiper arm operatably connected to said pressure source through the pressure conduit, valves in said pressure conduit to selectively operate said mechanisms simultaneously or individually, wiper blades having a perforated conduit therebetween and connected to said arm, said perforated conduit being connected to the fluid conduit of said primary conduits, a fluid reservoir conduit in heat exchange relationship with the internal combustion power plant and connected by a secondary conduit to the primary fluid conduit, another secondary conduit in close relationship with the car heater and connected to the primary fluid conduit, both secondary conduits having valves to selectively connect the hot air and hot liquid with the wiper mechanisms, whereby the wiper blades may be operated alone or with hot air or hot water or both.

ORVILLE W. SAILER.